United States Patent
Chen et al.

(10) Patent No.: US 8,018,217 B2
(45) Date of Patent: Sep. 13, 2011

(54) PWM POWER CONVERTER USING A MULTI-SLOPE RAMP SIGNAL TO IMPROVE THE TRANSIENT RESPONSE THEREOF

(75) Inventors: An-Tung Chen, Pingjen (TW); Jo-Yu Wang, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 220 days.

(21) Appl. No.: 12/461,213

(22) Filed: Aug. 5, 2009

(65) Prior Publication Data

US 2010/0033152 A1 Feb. 11, 2010

(30) Foreign Application Priority Data

Aug. 7, 2008 (TW) .............................. 97130148 A (51) Int. Cl.
*G05F 1/00* (2006.01)

(52) U.S. Cl. ...................................................... 323/288
(58) Field of Classification Search .................. 323/288, 323/283, 282
See application file for complete search history.

(56) References Cited

U.S. PATENT DOCUMENTS 7,265,530 B1 * 9/2007 Broach et al. ............. 324/117 R

* cited by examiner

*Primary Examiner* — Shawn Riley
(74) *Attorney, Agent, or Firm* — Rosenberg, Klein & Lee (57) ABSTRACT

A ramp generator is provided to provide a multi-slope ramp signal for a PWM power converter. The ramp generator determines the slope turning points for the multi-slope ramp signal according to the error signal of the PWM power converter and thereby improve the transient response of the PWM power converter. Preferably, the slope turning point of the multi-slope ramp signal varies with the average of the error signal and is thus adaptive to the error signal and thereby the load condition.

10 Claims, 8 Drawing Sheets

PWM POWER CONVERTER USING A MULTI-SLOPE RAMP SIGNAL TO IMPROVE THE TRANSIENT RESPONSE THEREOF

FIELD OF THE INVENTION

The present invention is related generally to pulse width modulation (PWM) power converters and, more particularly, to the transient response improvement of a PWM power converter.

BACKGROUND OF THE INVENTION

Figure 1:
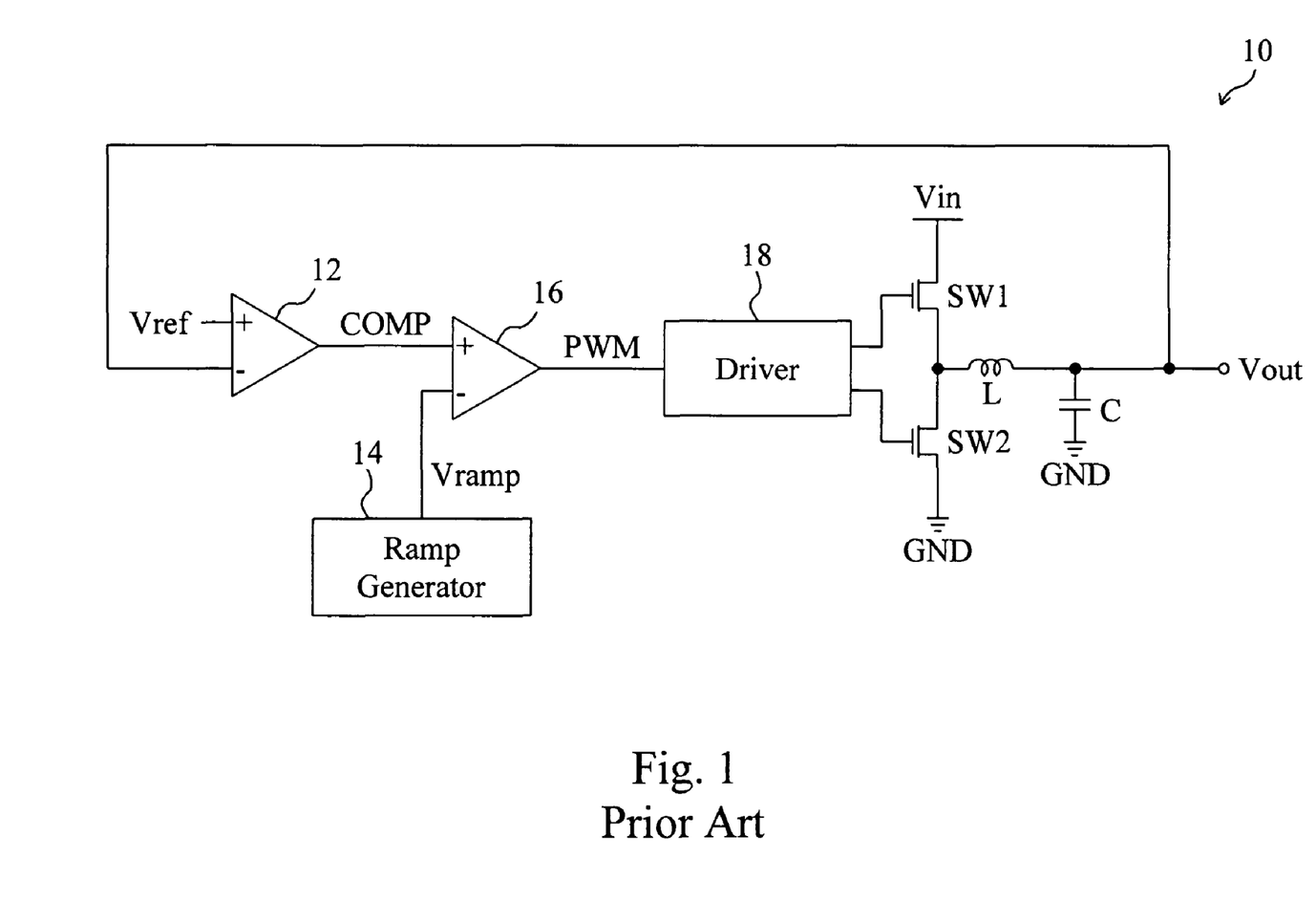
FIG. 1 is a circuit diagram of a conventional DC-to-DC PWM power converter.

A conventional pulse width modulator generates a pulse width modulation signal by comparing an error signal with a linearly increasing or decreasing reference signal. This reference signal is generally a linear ramp signal, which has a constant slope and frequency. A voltage mode DC-to-DC power converter also uses a ramp signal. For example, as shown in FIG. 1, a conventional DC-to-DC PWM power converter 10 includes an error amplifier 12 to amplify the difference between an output voltage Vout and a reference voltage Vref to generate an error signal COMP, a ramp generator 14 to provide a ramp signal Vramp, a comparator 16 to compare the error signal COMP with the ramp signal Vramp to generate a pulse width modulation signal PWM, and a driver 18 to switch the power switches SW1 and SW2 according to the pulse width modulation signal PWM to convert an input voltage Vin into the output voltage Vout. The frequency of the ramp signal Vramp is the operating frequency of the PWM power converter 10, and the reciprocal of the slope of the ramp signal Vramp is related to the loop gain of the PWM power converter 10. In a typical voltage mode PWM power converter, the ramp signal Vramp has a constant slope; however, in some circumstances, e.g., at load transient, duly changing the slope of the ramp signal Vramp may increase the loop gain and thereby improve the transient response of the PWM power converter 10. This is the most important function of using a nonlinear ramp signal. The most common method is to use a multi-slope piecewise ramp signal so that the error signal COMP will touch different slopes of the ramp signal in steady state and transient state, respectively, in order to increase the loop gain to improve the transient response and speed up the transient response.

Figure 2:
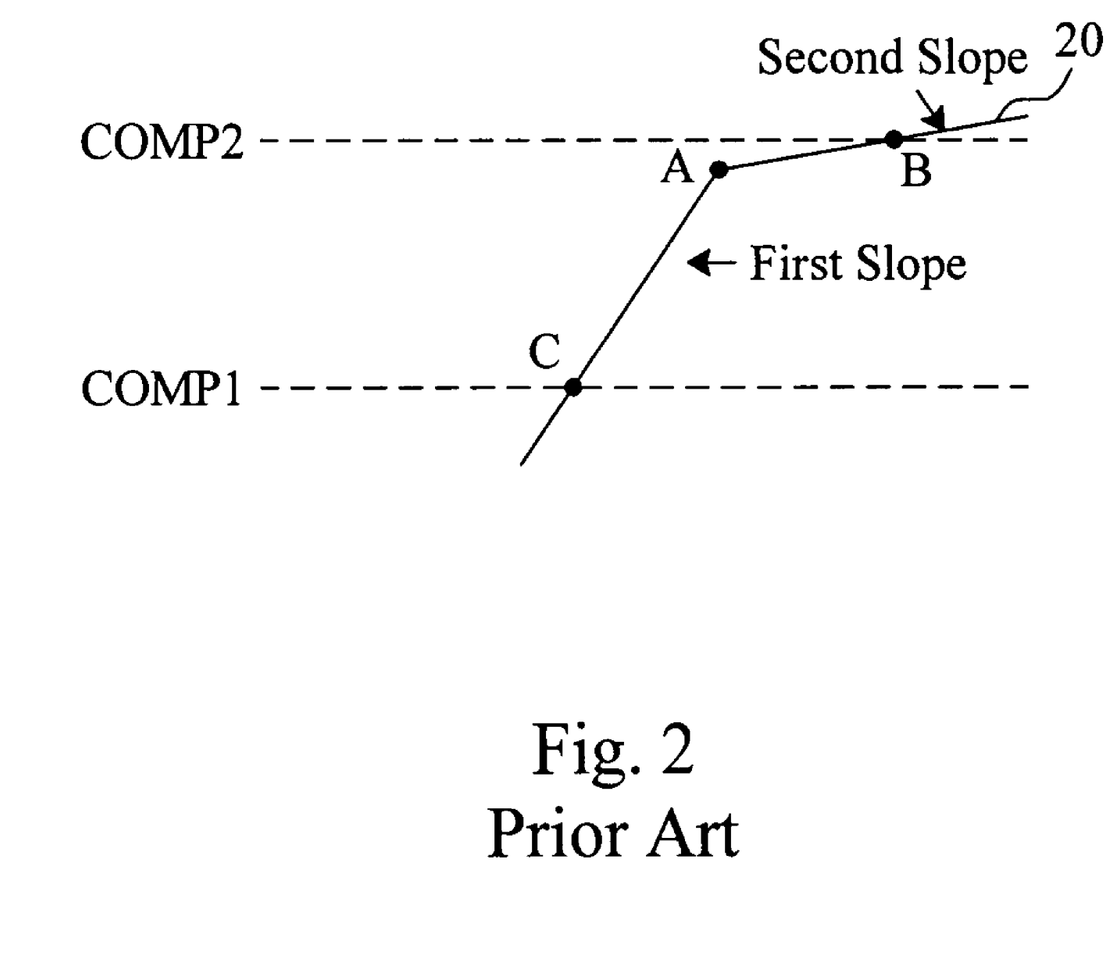
FIG. 2 is a diagram showing a two-slope ramp signal.

However, a problem exists for use of a multi-slope piecewise ramp signal, which involves the setting of a slope turning point between different ramps, i.e., the duty of the pulse width modulation signal PWM at a loop gain turning point. FIG. 2 is a diagram showing a two-slope ramp signal 20 having a slope turning point A. Assuming that the position C where an error signal COMP1 touches the first slope of the ramp signal 20 in steady state is far from the slope turning point A, it may be impossible for the error signal COMP1 to touch the second slope of the ramp signal 20 to increase the loop gain at load transient and consequently, the loop gain in transient state is just the same as that in steady state. In other words, the ramp signal 20 provides the same effect as a single-slope ramp signal. On the contrary, if an error signal COMP2 touches the second slope of the ramp signal 20 in steady state at the position B, then it will be difficult to adjust the stability of the whole loop because the second slope is set to get a higher loop gain and consequently improve transient response. In this case, it may cause the PWM power converter unable to operate stably. The duty of a PWM power converter is set by an external application circuit, a fixed slope turning point is unable to accomplish the desired effect.

U.S. Pat. No. 6,522,115 proposed to change the slope of the ramp signal by sensing the inductor current of a PWM power converter, which is based on the same principle as a current mode PWM power converter. However, sensing the inductor current requires an additional mechanism and thereby adds to complexity and cost of the circuit. Moreover, the resultant ramp signal has a concave curve waveform, which is inconvenient for compensation in voltage mode PWM power converters in different duty applications.

SUMMARY OF THE INVENTION

An object of the present invention is to provide circuit and method using a multi-slope ramp signal to improve the transient response of a PWM power converter.

According to the present invention, a PWM power converter comprises an output stage to generate an output voltage according to a pulse width modulation signal, an error amplifier connected to the output stage to amplify the difference between the output voltage and a reference voltage to generate an error signal, a ramp generator connected to the error amplifier to provide a multi-slope ramp signal and determine a slope turning point for the multi-slope ramp signal according to the error signal, and a comparator connected to the error amplifier and the ramp generator to compare the error signal with the multi-slope ramp signal to thereby determine a duty for the pulse width modulation signal.

Since the error signal is used to determine the slope turning point of the multi-slope ramp signal, the slope turning point will be adaptive to the error signal so that an appropriate slope turning point can be found automatically under different input/output voltage ratios. As a result, the whole system can not only stably operate with a preset modulation gain, but also allow for alteration of the modulation gain in response to load variation to improve the transient response.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 3:
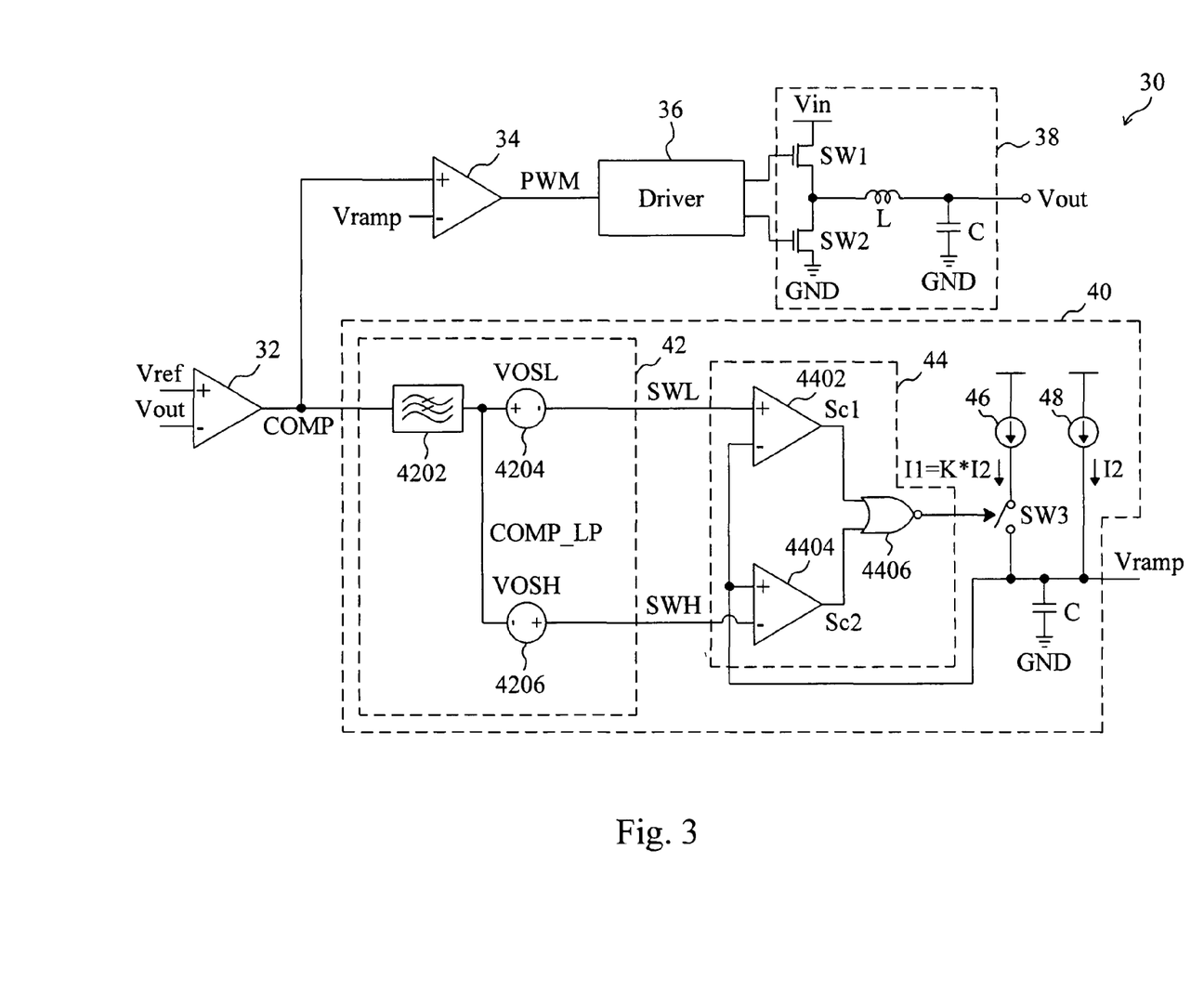
FIG. 3 is a circuit diagram of an embodiment according to the present invention.

Referring to FIG. 1, in a PWM power converter 10, the variation of an external load can be detected from the error signal COMP. In steady state, the output voltage Vout is stable and thereby the error signal COMP generated by the error amplifier 12 will be at steady value and the pulse width modulation signal PWM will have stable duty. In this case, if the average of the error signal COMP is extracted, it can be used as a slope turning point for the ramp signal Vramp. FIG. 3 is a circuit diagram of an embodiment according to the present invention, in which a PWM power converter 30 includes an error amplifier 32 to amplify the difference between an output voltage Vout and a reference voltage Vref to generate an error signal COMP, a ramp generator 40 to provide a multi-slope ramp signal Vramp having slope turning points varying with the average of the error signal COMP, a comparator 34 to compare the error signal COMP with the multi-slope ramp signal Vramp to generate a pulse width modulation signal PWM, and a driver 36 to switch power switches SW1 and SW2 according to the pulse width modulation signal PWM to convert an input voltage Vin into the output voltage Vout.

Figure 4:
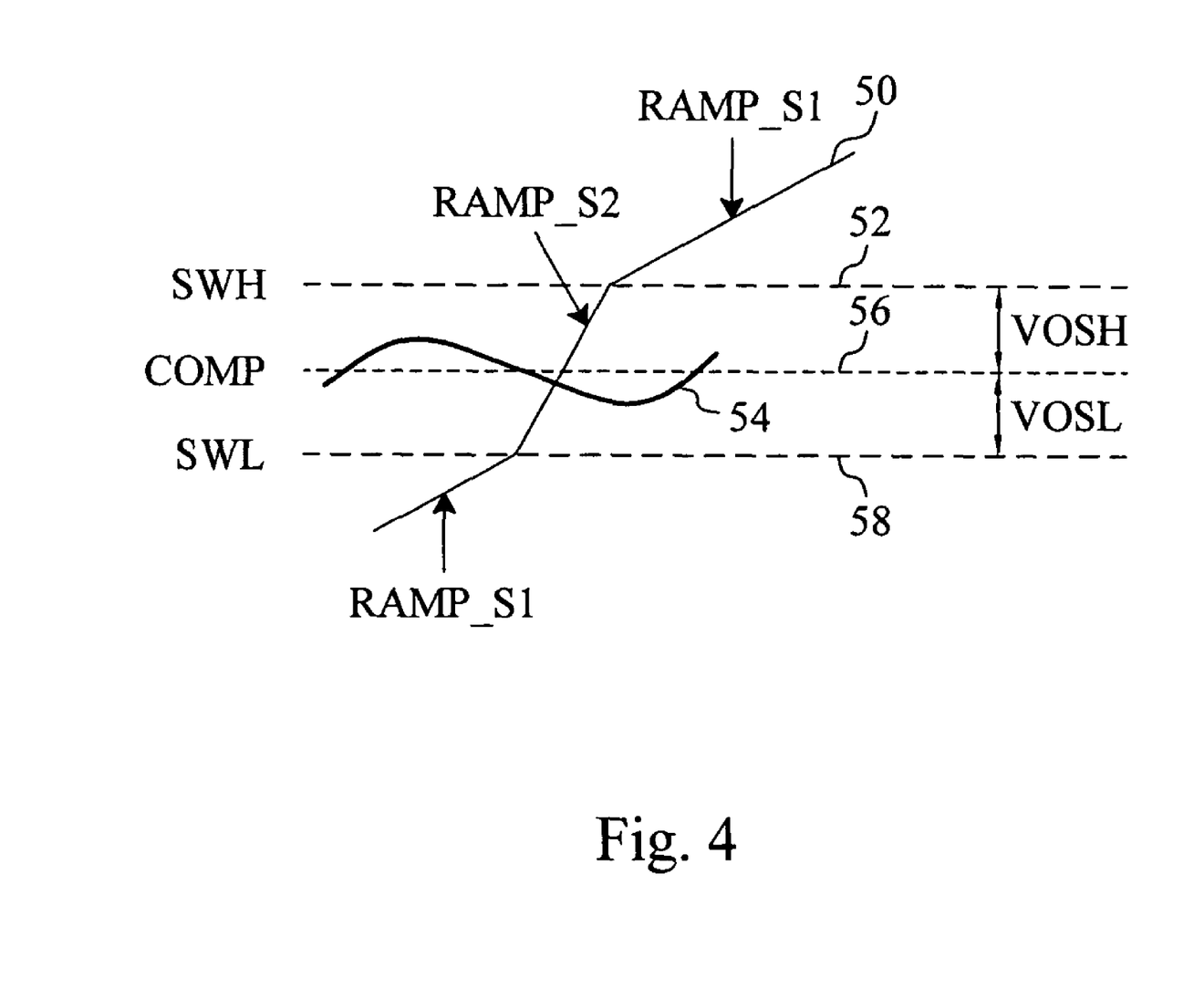
FIG. 4 is a diagram showing the operation of the multi-slope ramp generator of FIG. 3.

FIG. 4 is a diagram showing the operation of the multi-slope ramp generator 40 of FIG. 3. In the multi-slope ramp generator 40, current sources 46 and 48 provide charging currents I1 and I2 to charge a capacitor C, respectively, so as to generate the multi-slope ramp signal Vramp, the charging current I1 is K times of the charging current I2, a slope turning point determination circuit 42 includes a low pass filter 4202 to filter the error signal COMP to extract the average COMP_LP of the error signal COMP as shown by the waveform 56 of FIG. 4, the average COMP_LP is shifted by bias voltages VOSL and VOSH provided by bias voltage sources 4204 and 4206, respectively, to generate signals SWL and SWH as shown by the waveforms 58 and 52 of FIG. 4, and the signals SWL and SWH serve as the slope turning points of the multi-slope ramp signal Vramp. Due to the error signal COMP having some noise thereon as shown by the waveform 54 of FIG. 4, the bias voltages VOSH and VOSL are added to prevent switching to different slopes in steady state. A detection circuit 44 includes a comparator 4402 to compare the signal SWL with the multi-slope ramp signal Vramp to generate a signal Sc1, a comparator 4404 to compare the signal SWH with the multi-slope ramp signal Vramp to generate a signal Sc2, and an NOR gate 4406 to change the charging current to the capacitor C by switching a switch SW3 according to the signals Sc1 and Sc2, so as to change the slope of the multi-slope ramp signal Vramp.

Referring to FIG. 4, when the multi-slope ramp signal Vramp is lower than both the signals SWL and SWH as shown by the waveform 50, the signal Sc1 is high and the signal Sc2 is low, so the NOR gate 4406 turns off the switch SW3 such that only the charging current I2 charges the capacitor C and hence, the multi-slope ramp signal Vramp increases at a slower speed with a slope RAMP_S1. When the multi-slope ramp signal Vramp goes higher than the signal SWL but still lower than the signal SWH, both the signals Sc1 and Sc2 are low, so the NOR gate 4406 turns on the switch SW3 to allow both the charging currents I1 and I2 to charge the capacitor C and hence, the multi-slope ramp signal Vramp increases at a higher speed with a slope RAMP_S2. When the multi-slope ramp signal Vramp further goes higher than both the signals SWL and SWH, the signal SC1 stays at low and the signal Sc2 transits to high, so the NOR gate 4406 turns off the SW3 again such that only the charging current I2 charges the capacitor C and hence, the slope of the multi-slope ramp signal Vramp changes back to RAMP_S1. As shown in FIG. 4, the slope RAMP_S2 of the multi-slope ramp signal Vramp between the signals SWL and SWH is (K+1) times of the slopes in other ranges.

As load varies, the output voltage Vout and thereby the output COMP of the error amplifier 32 vary accordingly. In case the variation of the error signal COMP goes beyond the slope turning points SWL and SWH determined by the average COMP_LP, the multi-slope ramp signal Vramp will be switched to another slope, so as to improve the transient response by changing the loop gain of the PWM power converter 30. When the PWM power converter 30 has a different output/input voltage ratio (i.e., a different duty) which represents a different magnitude of the error signal COMP in steady state, the slope turning point of the multi-slope ramp signal Vramp will varies accordingly so that the whole system can stably operate with a preset modulation gain. The new slope turning point is the best slope turning point of the multi-slope ramp signal Vramp.

Figure 5:
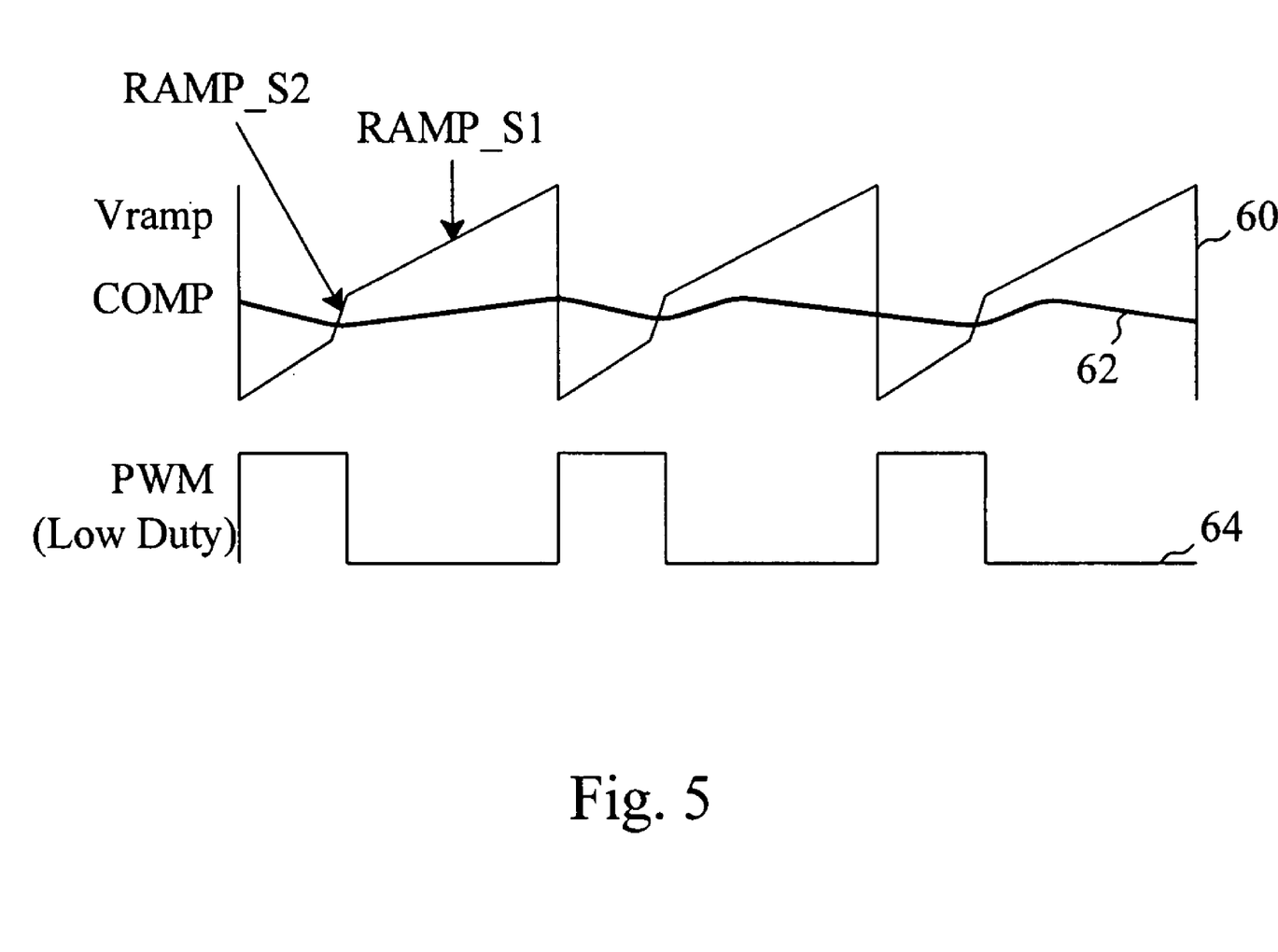
FIG. 5 is a waveform diagram of a PWM power converter with a lower duty in steady state.
Figure 6:
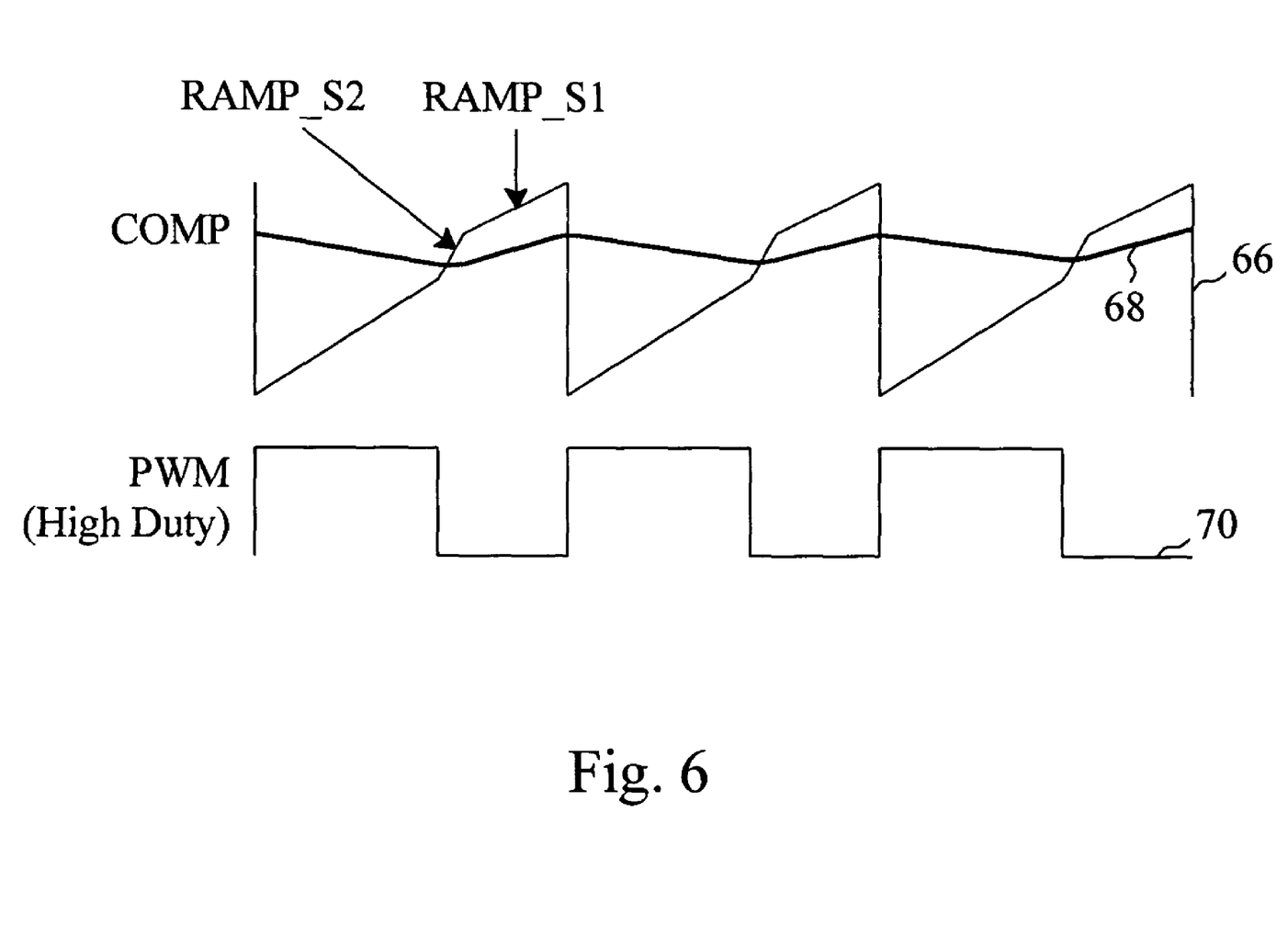
FIG. 6 is a waveform diagram of a PWM power converter with a higher duty in steady state.

FIG. 5 is a waveform diagram of a PWM power converter with a lower duty in steady state, in which waveform 60 represents the multi-slope ramp signal Vramp, waveform 62 represents the error signal COMP, and waveform 64 represents the pulse width modulation signal PWM. When the PWM power converter 10 has a lower duty as shown by the waveform 64, the error signal COMP has a lower level as shown by the waveform 62, so the slope turning point of the multi-slope ramp signal Vramp declines accordingly as shown by the waveform 60. Consequently, the error signal COMP still touches the slope RAMP_S2. FIG. 6 is a waveform diagram of a PWM power converter with a higher duty in steady state, in which waveform 66 represents the multi-slope ramp signal Vramp, waveform 68 represents the error signal COMP, and waveform 70 represents the pulse width modulation signal PWM. When the power converter 10 has a higher duty as shown by the waveform 70, the error signal COMP has a higher level as shown by the waveform 68, so the slope turning point of the multi-slope ramp signal Vramp rises accordingly as shown by the waveform 66. Consequently, the error signal COMP still touches the slope RAMP_S2. As shown in FIGS. 5 and 6, in steady state, the ramp generator 40 may have the error signal COMP touching the same slope of the multi-slope ramp signal Vramp regardless of the duty of the pulse width modulation signal PWM.

Figure 7:
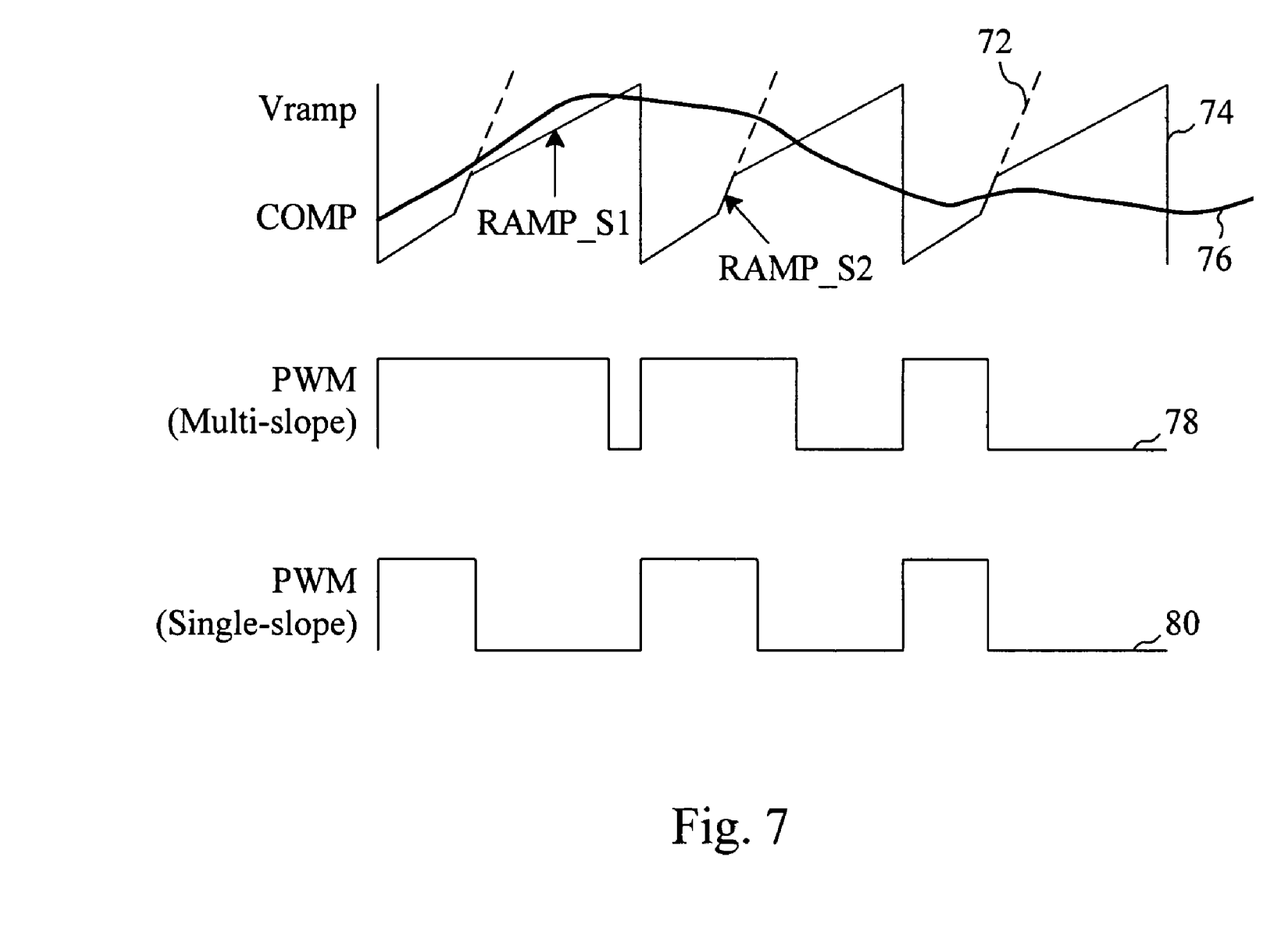
FIG. 7 is a waveform diagram of a PWM power converter with a lower duty in transient state.
Figure 8:
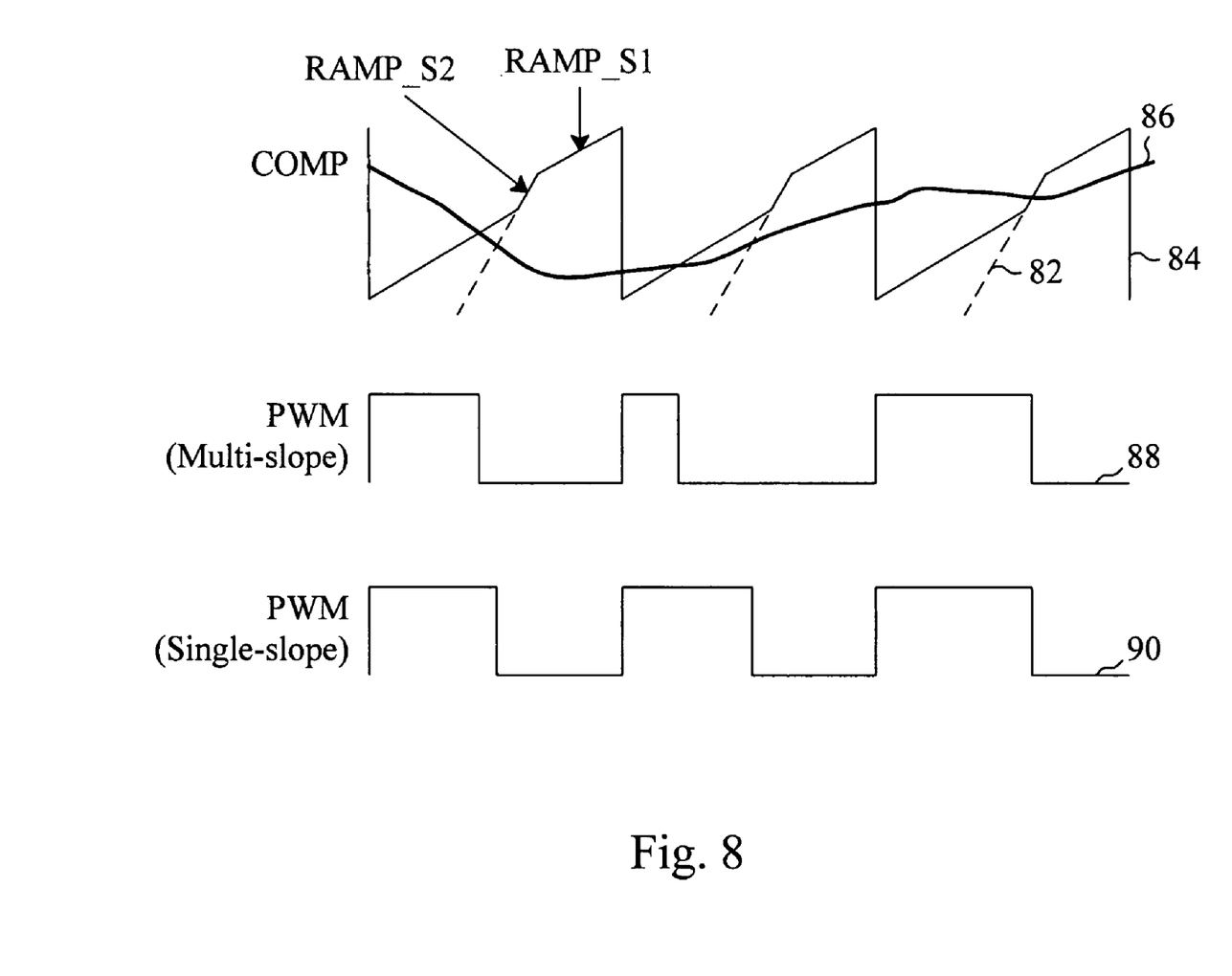
FIG. 8 is a waveform diagram of a PWM power converter with a higher duty in transient state.

FIG. 7 is a waveform diagram of a PWM power converter with a lower duty in transient state, in which waveform 72 represents a conventional single-slope ramp signal, waveform 74 represents a multi-slope ramp signal Vramp provided by the ramp generator 40, waveform 76 represents the error signal COMP, waveform 78 represents a pulse width modulation signal PWM obtained according to the multi-slope ramp signal Vramp, and waveform 80 represents a pulse width modulation signal PWM obtained according to the conventional single-slope ramp signal. FIG. 8 is a waveform diagram of a PWM power converter with a higher duty in transient state, in which waveform 82 represents a conventional single-slope ramp signal, waveform 84 represents a multi-slope ramp signal Vramp provided by the ramp generator 40, waveform 86 represents the error signal COMP, waveform 88 represents a pulse width modulation signal PWM obtained according to the multi-slope ramp signal Vramp, and waveform 90 represents a pulse width modulation signal PWM obtained according to the conventional single-slope ramp signal. As shown in FIGS. 7 and 8, no matter whether the load changes from low to high or from high to low, the duty of the pulse width modulation signal PWM obtained from the multi-slope ramp signal Vramp varies more rapidly than that of the pulse width modulation signal obtained from the conventional single-slope ramp signal, as shown by the waveforms 78, 80, 88 and 90. This indicates that the multi-slope ramp signal Vramp provided by the ramp generator 40 has a better transient response.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A PWM power converter, comprising:
   an output stage generating an output voltage according to a pulse width modulation signal;
   an error amplifier connected to the output stage, amplifying a difference between the output voltage and a reference voltage to generate an error signal;
   a ramp generator connected to the error amplifier, providing a multi-slope ramp signal and determining a slope turning point for the multi-slope ramp signal according to the error signal; and
   a comparator connected to the error amplifier and the ramp generator, comparing the error signal with the multi-slope ramp signal to thereby determine a duty for the pulse width modulation signal.

2. The PWM power converter of claim 1, wherein the ramp generator comprises:
   a slope turning point determination circuit connected to the error amplifier, determining the slope turning point for the multi-slope ramp signal according to the error signal; and
   a detection circuit connected to the slope turning point determination circuit, monitoring the multi-slope ramp signal to change the slope of the multi-slope ramp signal when the multi-slope ramp signal arrives at the slope turning point.

3. The PWM power converter of claim 2, wherein the slope turning point determination circuit comprises:
   an average circuit connected to the error amplifier, extracting an average of the error signal; and
   a bias voltage source connected to the average circuit, providing a bias voltage to shift the average of the error signal to thereby determine the slope turning point.

4. The PWM power converter of claim 2, wherein the detection circuit comprises a comparator connected to the bias voltage source, comparing the slope turning point with the multi-slope ramp signal to change the slope of the multi-slope ramp signal.

5. The PWM power converter of claim 2, wherein the ramp generator further comprises:
   a capacitor; and
   a current source connected to the capacitor, providing a charging current to charge the capacitor to generate the multi-slope ramp signal.

6. The PWM power converter of claim 5, wherein the detection circuit controls a magnitude of the charging current to change the slope of the multi-slope ramp signal.

7. A control method for a PWM power converter, comprising:
   generating an output voltage according to a pulse width modulation signal;
   amplifying a difference between the output voltage and a reference voltage to generate an error signal;
   generating a multi-slope ramp signal having a slope turning point determined by the error signal for the multi-slope ramp signal; and
   comparing the error signal with the multi-slope ramp signal to thereby determine a duty for the pulse width modulation signal.

8. The control method of claim 7, wherein the step of generating a multi-slope ramp signal comprises:
   extracting an average of the error signal;
   determining the slope turning point for the multi-slope ramp signal according to the average of the error signal; and
   monitoring the multi-slope ramp signal to change the slope of the multi-slope ramp signal when the multi-slope ramp signal arrives at the slope turning point.

9. The control method of claim 8, wherein the step of determining the slope turning point for the multi-slope ramp signal comprises shifting the average of the error signal with a bias voltage.

10. The control method of claim 8, wherein the step of monitoring the multi-slope ramp signal to change the slope of the multi-slope ramp signal comprises:
    charging a capacitor with a charging current to generate the multi-slope ramp signal; and
    changing a magnitude of the charging current when the multi-slope ramp signal arrives at the slope turning point.

* * * * *